United States Patent [19]

Jones

[11] Patent Number: 5,796,068

[45] Date of Patent: Aug. 18, 1998

[54] EXTERNAL LASER WELDER FOR PIPELINE

[75] Inventor: Richard L. Jones, Houston, Tex.

[73] Assignee: CRC-Evans Pipeline International, Inc., Houston, Tex.

[21] Appl. No.: 780,638

[22] Filed: Jan. 8, 1997

Related U.S. Application Data

[62] Division of Ser. No. 321,214, Oct. 11, 1994, Pat. No. 5,593,605.

[51] Int. Cl.$^6$ .................................................. B23K 26/00
[52] U.S. Cl. ........................................................ 219/121.63
[58] Field of Search ............................ 219/121.63, 121.64

[56] References Cited

U.S. PATENT DOCUMENTS

| | | | |
|---|---|---|---|
| 3,555,239 | 1/1971 | Kerth | 219/121.63 |
| 3,612,808 | 10/1971 | Nelson et al. | 219/60 A |
| 4,001,543 | 1/1977 | Bove et al. | 219/121.63 |
| 4,029,932 | 6/1977 | Cook | 219/121.63 |
| 4,080,525 | 3/1978 | Gobetz | 219/121.63 |
| 4,088,865 | 5/1978 | Peters et al. | 219/121.63 |
| 4,429,211 | 1/1984 | Carstens et al. | 219/121.63 |
| 4,533,814 | 8/1985 | Ward | 219/121.64 |
| 4,577,087 | 3/1986 | Chadwick | 219/121.63 |
| 4,591,294 | 5/1986 | Foulkes | 219/121.63 |
| 4,607,150 | 8/1986 | Bannister | 219/121.63 |
| 5,059,765 | 10/1991 | Laing | 219/125.11 |
| 5,179,260 | 1/1993 | Kroehnert | 219/121.63 |
| 5,190,204 | 3/1993 | Jäck et al. | 228/5.7 |
| 5,196,671 | 3/1993 | Kroehnert | 219/121.63 |
| 5,347,101 | 9/1994 | Brennan et al. | 219/124.34 |
| 5,601,735 | 2/1997 | Kawamoto et al. | 219/121.63 |

FOREIGN PATENT DOCUMENTS

| | | | |
|---|---|---|---|
| 58-35090 | 3/1983 | Japan | 219/121.77 |
| 1553582 | 10/1979 | United Kingdom | 219/121.63 |

OTHER PUBLICATIONS

Mazumder, J., "Laser Welding: State of the Art Review," *Journal of Metals*, vol. 34, No. 7, Jul., 1982, pp. 16–24.

Lur'e, E.S., et al., "Properties of Welded Joints in High-Strength Pipe Steels Produced by Welding With a Continuous $CO_2$ Laser," *Welding Production*, vol. 33, No. 9, Sep., 1986, pp. 28–31.

Banas, C.M., et al., "The Changing Frontiers of Laser Materials Processing," Proceedings of the 5th International Congress on Applications of Lasers and Electro-Optics, Arlington, Virginia, Nov. 10–13, 1986.

Smith, L.M., "Pipelaying Using Laser Welding: A Comparison of Weld Properties in Five Pipeline Steels," International Conference on Power Beam Technology, Brighton, U.K., Sep. 10–12, 1986.

Prosser, K., "Alternative Welding Systems for Pipelines," *Rivista Italiana Della Saldatura*, Anno. XLII–n. 4, Luglio–Agosto, 1990, pp. 385–397.

Merchant, V.E., "Laser Pipeline Welding—The Potential and the Problems," American Gas Association 1986 Operating Section Proceedings, Arlington, Virginia, pp. 574–578.

C. Parrini, et al., "Laser Welding of Pipeline Steels," Proceedings of an International Conference, Nov. 9–12, 1976, Rome, Italy, pp. 604–624.

Russian article, Nov., 1986, ISSN 0039-2448.

*Primary Examiner*—Geoffrey S. Evans
*Attorney, Agent, or Firm*—Sidley & Austin

[57] ABSTRACT

An automatic external welder travels on tracks which are attached to the exterior surface of the pipeline and functions to weld together the abutting ends of pipe segments. The automatic welder has a carriage assembly that includes a laser source for producing a laser beam for performing the welding operation at the weld region. The laser source is positioned in a first embodiment to produce a laser beam which is parallel to the axis of the pipe and is reflected for direction to the weld joint. In a second embodiment, the laser source is positioned on the carriage such that the laser beam is directed without deflection to the welding junction. For each embodiment, the laser source is carried by the carriage assembly so that it orbits about the pipeline to produce a complete weld of the abutting pipe ends.

7 Claims, 13 Drawing Sheets

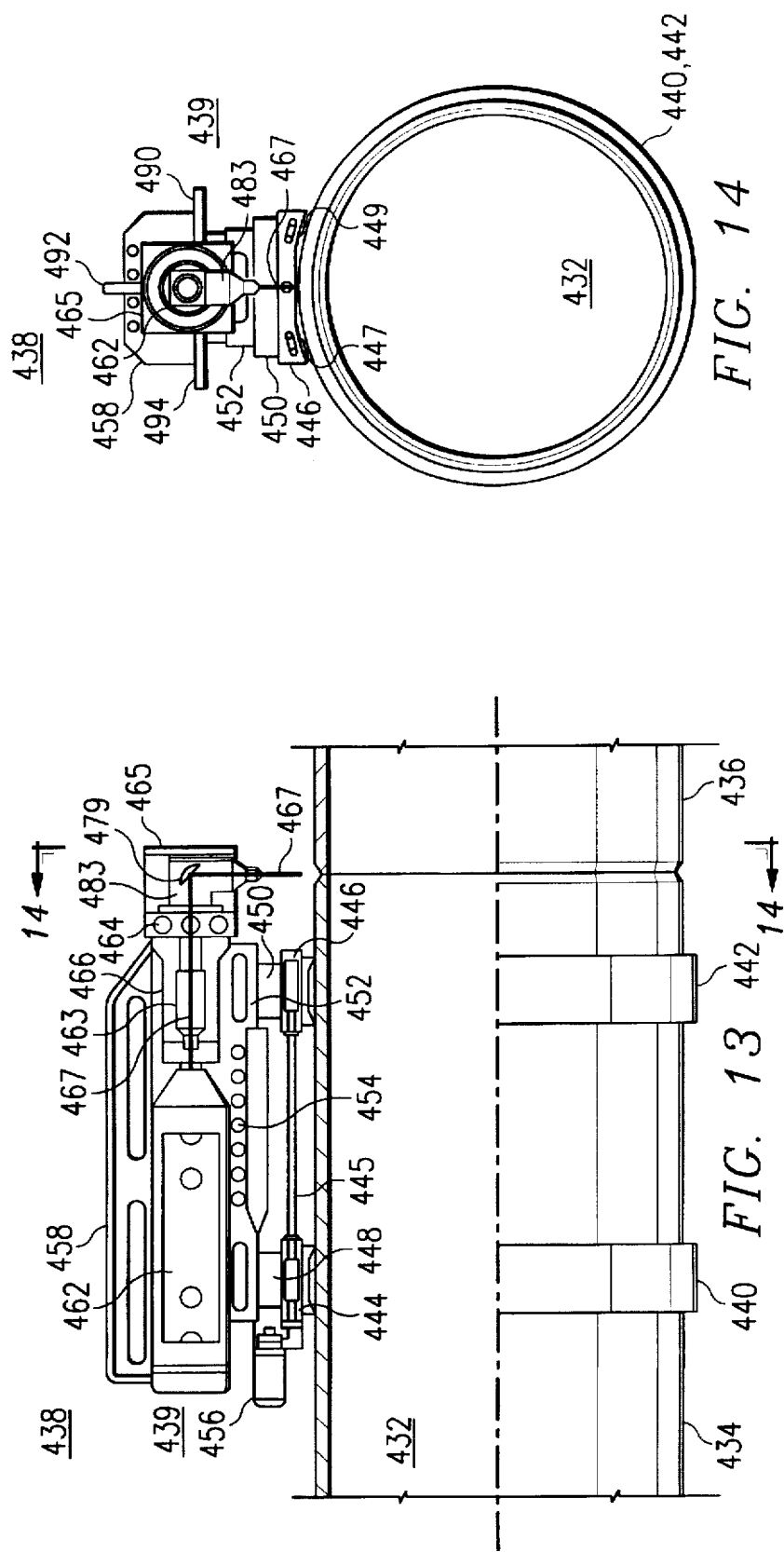

EXTERNAL LASER WELDER FOR PIPELINE

CROSS REFERENCE TO RELATED APPLICATIONS

This is a division of U.S. patent Ser. No. 08/321,214 filed Oct. 11, 1994, now U.S. Pat. No. 5,593,605.

TECHNICAL FIELD OF THE INVENTION

This invention relates in general to welding and in particular to apparatus for internally and externally welding a pipeline.

BACKGROUND OF THE INVENTION

Liquefied and gaseous products are typically transported over long distances most efficiently using transmission pipelines. These pipelines are generally constructed by welding together individual pipe segments at their abutting ends from the outside as well as the inside to form a continuous pipeline. The pipeline may also need internal welding on occasions where the continuity of the pipeline has been disturbed by external forces such that adjacent pipe segments are shifted relative to each other. The welding of these pipe segments has to be performed with precision and with a minimum distortion of these segments to maintain the best possible joint strength. Accordingly, an efficient, accurate and reliable welding machine is needed to perform weldings on the pipeline joints internally.

Since the joint ends of a tubular pipeline cannot be rotated about a stationary welding source, automatic pipe welding equipment typically traverses a welding mechanism circumferentially about the abutting ends of the pipe segments. Automated machines to perform this operation are shown in U.S. Pat. No. 3,612,808 to Nelson, U.S. Pat. No. 4,525,616 to Slavens, and U.S. Pat. No. 5,059,765 to Laing. However, it is desirable to have additional precision and repeatability in the welding process than those provided by the current internal welding systems employing torch or arc welding techniques. Further, conventional automated welding equipment faces a productivity trade-off: the welding machine can travel more slowly in exchange for more reliable welding or travel faster for a higher throughput, but at a higher probability of causing welding defects. The present invention aims at eliminating the above-mentioned disadvantages and accordingly provides a welding apparatus which makes it possible to obtain a uniform weld and reduce substantially the time required for welding pipe segments together to form a pipeline.

These advantages are achieved by using as a welding agent a laser beam from a movable laser source that can be positioned inside a pipeline in the vicinity of the abutting ends of the pipe segments. The advantages of using a laser beam having a power output great enough to weld together pipe segments as a welding agent include: (1) welding in single pass for faster processing, (2) welding in a room atmosphere without special environmental preparation, (3) welding more accurately, (4) welding with little or no induced contamination, (5) welding with precisely directed and concentrated energy that results in no distortion at the end of the welding, and (6) welding with the capability of rapid starting and stopping for improved throughput.

Numerous laser welding machines have been adapted for pipeline welding. For example, U.S. Pat. No. 4,591,294, which issued on May 27, 1986 to Foulkes, discloses a pipe welding assembly in which welding of one pipe length to another is accomplished by gas lasers mounted to rotate around the axis of the pipes to weld the pipe ends together. However, the lasers disclosed in Foulkes cannot traverse the length of the pipes. U.S. Pat. No. 4,533,814, which issued on Aug. 6, 1985 to Ward, discloses a stationary laser source whose beam is directed to the pipe joint via a flexible laser beam guide. U.S. Pat. No. 4,429,211, which issued on Jan. 31, 1984 to Carstens et al., also discloses a laser welding system for welding 360° around a pipe. However, the laser in Carstens is mounted remotely from the welding site and requires passive and active beam alignment systems for real time compensation of angular misalignment. U.S. Pat. No. 4,080,525, which issued on Mar. 21, 1978 to Gobetz, discloses an external welding device having laser transmitting means to orbitally direct the laser beam to the welding joints from a stationary laser source. However, a laser welding system having a laser source located remotely from the welding spot suffers from inaccuracies that result from beam misalignment, as pointed out by the laser system described in Carstens. U.S. Pat. No. 4,001,543, which issued on Jan. 4, 1977 to Bove et al., discloses a laser positioned to direct a laser beam along the axis of the pipeline and a reflection system mounted for movement through an arc of 360° in the path of the laser beam to reflect that beam radially on the abutting ends of the pipeline. However, the laser disclosed in Bove is stationary and is located remotely from the actual welding locations. Hence, a need exists for a laser welder having a laser source that is located locally to the welding joint. Further, a need exists for a laser welder that can be mounted for traveling within the pipeline.

SUMMARY OF THE INVENTION

A selected embodiment of the present invention is an apparatus for internally welding together the abutting ends of two pipe segments. An internal welder unit has a carriage assembly for traveling inside the pipeline to position itself at a junction of the pipeline segments. The respective abutting ends of the rear and forward pipe segments are then aligned together using a pair of double acting air cylinder assemblies which activates a plurality of shoes for firmly engaging the inside surface of each of said pipe segments. Next, one or more laser beams from a laser source mounted on the carriage assembly are directed such that the laser beam travels circumferentially around the interior of the pipeline joint with sufficient energy to weld respective abutting ends of the pipe segments together.

Another selected embodiment of the present invention is an apparatus for externally welding together the abutting ends of two pipe segments. The external welder has a carriage assembly carried on a track mounted on the outside of the pipeline. The carriage assembly contains a laser source for generating a laser beam that is directed to the junction of the abutting ends of the pipe segments as the carriage assembly orbits around the outside of the pipeline to weld the pipe segments together.

One aspect of the present invention is to provide an apparatus for automatically welding pipe joints and the like at an improved rate and with an improved quality of weld. Another aspect of the present invention is to provide a welding system in which the laser source is brought close to the pipe joint to be welded so that energy is not lost through beam attenuation and so that accuracy of the weld spot is not lost due to sags inherent in a long pipeline. Still another aspect of the present invention is to provide a welding system in which the laser beam on a carriage assembly located in the neighborhood of the pipe joint is accurately delivered to the welding joint using a reflecting surface or a laser beam conductor to perform a 360° weld about a pipeline while maintaining the alignment of the laser generation and transportation system to deliver the focal power precisely along the pipe joint to be welded. Still another aspect of the present invention is to provide a welding system using four laser beam conductors, each of which performs a 90° weld about the inside diameter of a pipeline in order to weld the abutting ends of the pipelines together. Yet another aspect of the present invention is to provide an external welding system whose carriage assembly is transported on a track mounted on the outside of the pipeline. Still another aspect of the present invention is to provide an external welding system whose laser beam is directed to the junction of the abutting ends of the pipeline to weld the pipelines together as the external welding system orbits around the outside of the pipeline on the track.

BRIEF DESCRIPTION OF THE DRAWINGS

The present invention will now be described in more detail with reference to the accompanying drawings which illustrate the different ways of using the welding apparatus of the present invention in practice. The drawings illustrate the invention only by way of example and are not limiting in the accompanying drawings.

FIG. 13 is a longitudinal, elevational view, partially in cross section, of a fourth embodiment of an external welder;

FIG. 14 is a transverse cross-sectional view of the external welder of FIG. 13 taken along line 14—14.

DETAILED DESCRIPTION

Figure 1:
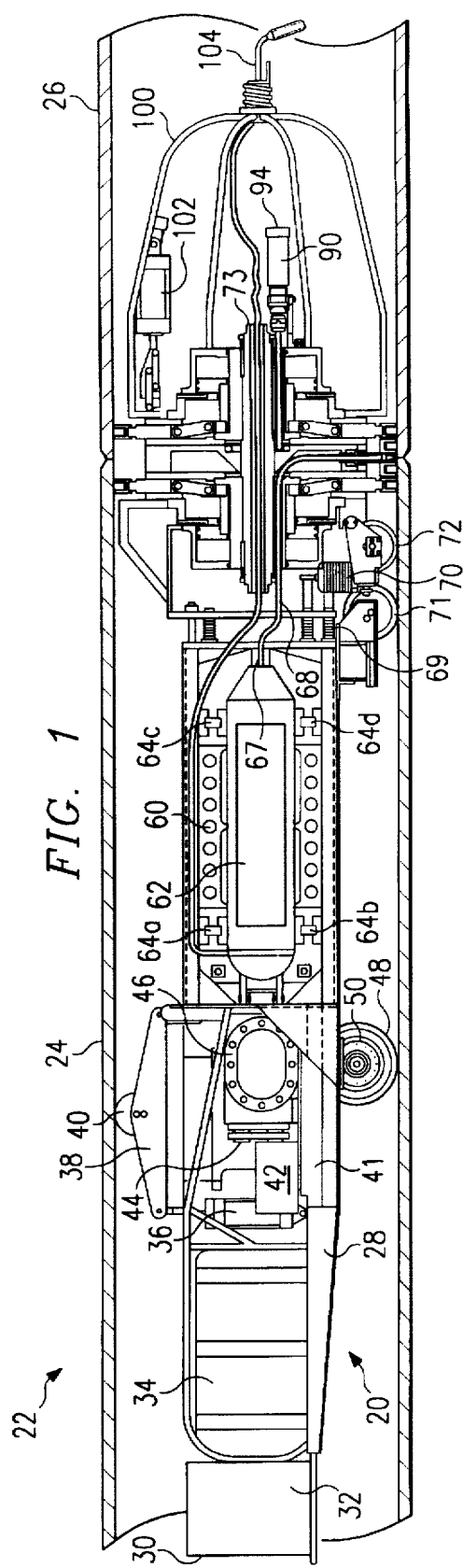
FIG. 1 is a longitudinal, elevational view, partly in cross-section, of a first embodiment of an internal welder in accordance with the present invention.

A longitudinal, elevational view of the first embodiment for an internal welder unit 20 in accordance with the present invention is illustrated in FIG. 1.

Referring to FIG. 1, the internal welder unit 20 is positioned within a pipeline 22. The pipeline 22 is made up of a plurality of pipe segments, including a first pipe segment 24 and a second pipe segment 26, which are joined together at their abutting ends. The internal welder unit 20 has a carriage assembly 28 for propelling and positioning the internal welder unit 20 inside the pipeline 22. The carriage assembly 28 is essentially described in U.S. Pat. Nos. 3,612,808 to Nelson et al. which was issued on Jun. 4, 1969, 3,632,959 to Nelson et al. which issued on Jan. 4, 1972 and 5,059,765 to Laing which issued on Oct. 22, 1991, and all three of these patents are hereby incorporated by reference.

The carriage assembly 28 has a battery compartment 30 having a battery 32 inside for supplying electricity to the internal welder unit 20. An air tank 34 is mounted on the carriage assembly 28 next to the battery compartment 30 for supplying compressed air or other suitable gas for actuation of various mechanical assemblies within internal welder unit 20, such as a pressure wheel actuator 36. Pressure wheel actuator 36 is coupled to pressure wheel mount 38 to urge a pressure wheel 40 against the interior of the pipe segment 24 for providing traction in conjunction with a drive wheel 48.

The internal welder unit 20 contains a drive wheel assembly 41 having a drive wheel motor 42 which drives a motor chain 44. Motor chain 44 drives the shaft of a gear drive unit 46, which in turn rotates the drive wheel 48 using a gear drive chain 50.

The carriage assembly 28 further contains a laser assembly 60 with a laser source 62 supported on first, second, third and fourth laser mounts 64a, 64b, 64c and 64d, respectively. The laser mounts 64a, 64b, 64c and 64d provide suspension support to laser assembly 60 to prevent unwanted shocks from damaging the laser source.

A selected laser source 62 is a ZODIAK™ model laser invented by Herbert J. J. Sequin. A laser source is described in U.S. Pat. Nos. 4,604,752 and 5,029,173, and these patents are incorporated by reference. Protection for the laser assembly 60 is further afforded through a plurality of flexible mountings 69 and a vertical flexible mounting 70, which couples carriage assembly 28 to a line-up station 73. The flexible mounting 69 is provided between the forward portion of the carriage assembly 28 and the rear portion of line-up station 73 to prevent forced misalignment of any components of the internal welder unit 20 when it is clamped at the end of a pipe segment 24 or 26. The vertical flexible mounting 70 is provided between the front wheels of carriage assembly 28 and line-up station 73 to prevent unwanted shocks from damaging the laser source and to center the line-up assembly before the shoes of the line up assembly are brought into contact with the pipe.

A first front wheel 71 is attached to the front bottom portion of carriage assembly 28 to allow a second front wheel 72 to drive the carriage assembly 28 back into the pipe when the internal welder is driven too far forward. The combination of pressure wheel 40, drive wheel 48, and second front wheel 72 permit the internal welder unit 20 to be pushed or pulled within the pipeline 22 along the length of the pipeline.

During operation, the internal welding unit 20 is advanced from the weld just completed to the next junction in the pipeline. Once the internal welder is properly positioned within the pipeline, the line-up station 73 is activated to force the abutting ends of the pipe segments 24 and 26 to be aligned and ready for laser welding. An actuator 102 provides horizontal alignment for the line-up station 73 before the engagement of the line-up station 73 with pipe segment 24.

Once the line-up station 73 is engaged with the abutting ends of pipe segments 24 and 26, a laser beam 67 is generated by the laser source 62. The laser beam 67 has a power output great enough to weld together the ends of pipe segments 24 and 26. As shown in FIG. 1, the laser beam 67, which is generated by laser source 62, passes into the line-up station 73 inside a laser beam conductor 68. The laser beam conductor 68 is preferably made up of fiber optic cables which collect the laser beam 67 coming out of the laser source 62 for transmission to the inner periphery of the abutting ends of the pipe segments 24 and 26. The laser beam conductor 68 extends essentially horizontally along the axis of the pipeline until it reaches the abutting ends of the pipe segments where it is redirected to point essentially at a 90° angle relative to the axis of the pipeline 22. The laser beam conductor 68 is then rotated around the circumference of the interior of the pipe segments 24 and 26 to deliver laser beam 67 at the pipe junction to weld the two pipe segments 24 and 26 together.

Electrical power and control signals are provided to the internal welder through signal and power cable assembly 104. The signal and power cable assembly 104 includes a set of data wires which communicate with control electronics on-board the internal welder unit 20. The signal and power cable assembly 104 also has a power cable to supplement the power coming from battery 32 during the periods where the laser source is activated. Signal and power cable assembly 104 enters the internal welder unit 20 through the tip of tubular-framed nose cone 100. The tubular-framed nose cone 100 serves to protect and support the components housed therein. The signal and power cable assembly 104 passes from the tubular-framed nose cone 100 to other components of the internal welder unit 20 through a passageway extending across a rotatable disk in line-up station 73. The internal welder unit 20 further includes a laser drive motor 90 and a position encoder 94.

Figure 2:
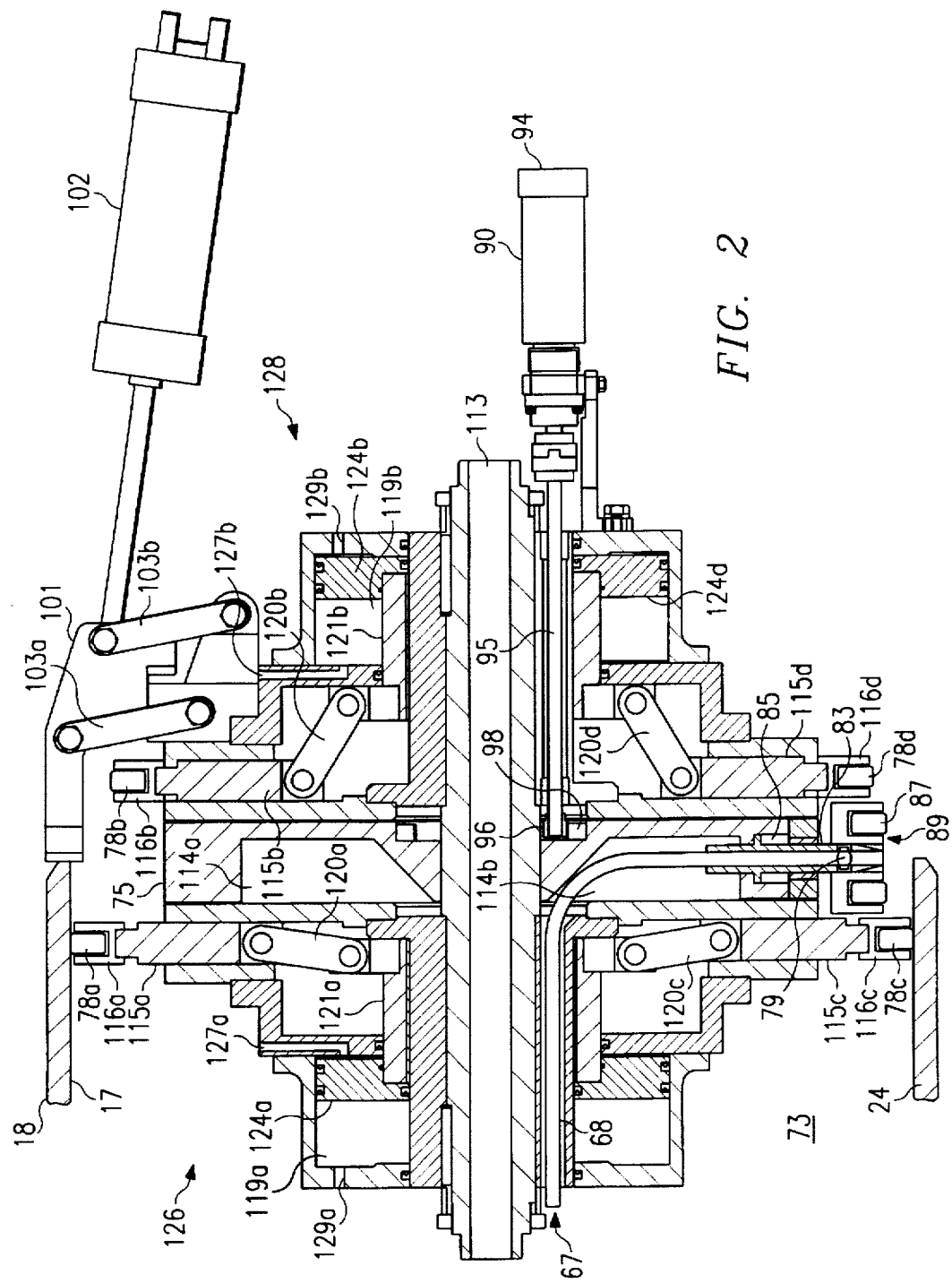
FIG. 2 is a longitudinal, cross-sectional view of the line-up clamp assembly of the internal welder of FIG. 1 during alignment.

The operation of the line-up station 73 and the mechanism for rotating the laser beam conductor 68 is shown in detail in FIG. 2. As shown in FIG. 2, pipe segment 24 has an inner surface 17 and outer surface 18. Within inner surface 17, the line-up station 73 includes a first double acting air cylinder assembly 126 and a second double acting air cylinder assembly 128. The air cylinder assemblies 126 and 128 actuate shoes 78a–78d to clamp the internal welder unit 20 to the pipe segments 24 and 26. There are plenty of sets of air cylinders and shoes; for example, 16 sets for each of the air cylinder assemblies. The first and second double acting air cylinder assemblies 126 and 128 are identical in operation and the following description applies to both of the assemblies 126 and 128.

As shown on the upper left of FIG. 2, shoe 78a is attached to a shoe holder 116a. Shoe holder 116a, in turn, is attached to a cylindrical shaft 115a. The shaft 115a is connected by a link 120a to a ring 121a which is slidable along the axis of the line-up station 73. Thus, the movement of shoe 78a is restricted to only radial motion relative to the center axis of the line-up station 73. A piston 124a in the cylinder assembly 126 is attached to the remaining end of the ring 121a to apply motion of the ring 121a relative to the center axis of the line-up station 73.

Piston 124a is slidably sealed to the inner walls of a chamber 119a. Chamber 119a has an annular configuration which is coaxial with the axis of line-up station 73. When a pressurized fluid, such as compressed air or hydraulic fluid, is caused to enter chamber 119a through a port 129a, the piston 124a moves in the opposite direction toward the far end of chamber 119a to work through the intervening components and activate shoe 78a. The thus activated shoe moves radially outward to clamp against an inner surface 17 of the pipe segment 24. In a similar manner, shoe 78c moves radially outward to clamp against the inner surface of pipe segment 24. The linear motion of ring 121a engages link 120c and actuates shaft 115b to clamp shoe 78c through shoe holder 116a against the inner surface 17. Thus, to align the abutting ends of the pipe segments 24 and 26, all 16 shoes of cylinder assembly 126 are extended outward at the same time when pressurized fluid is applied to chamber 119a. When fluid pressure is admitted to the other side of chamber 119a via a second port 127a, the piston 124a moves in the opposite direction toward the first port 129a. The shoes 78a and 78c will move inward, releasing the pipe segment 24.

Once the internal welding unit is first advanced to the junction between first and second pipe segments 24 and 26, an alignment operation is carried out and then the shoes 78a and 78c are longitudinally positioned so that they can expand radially outward from the first line-up clamp assembly 74 to clamp against the inner periphery of the first pipe segment 24. The position of the first line-up clamp assembly is adjusted by the operation of the drive wheel 48 to cause the line-up station 73 to be positioned a short distance inside from the pipeline joint.

The alignment operation is assisted by the use of a plurality of aligners 101, preferably three aligners, which are equally spaced around the axis of the pipe. The aligners are raised by three corresponding actuators, such as pneumatic or hydraulic actuators 102, through parallel support arms 103a and 103b. The aligners 101 are activated and positioned facing the exposed end of pipe segment 24 before the front and rear shoes 78a–78d are raised and before the second pipe segment 26 has been butted up against the first pipe segment 24. With the aligners 101 raised, the internal welder is backed up until the three aligners 101 are in contact with the face of the pipe segment 24. Once the internal welder unit 20 is aligned with the end of the pipe segment 24, the aligners 101 are retracted out of the way to allow the installation of the pipe segment 26 abutting pipe segment 24. Line-up station 73 also has a passageway 113 for allowing gas and electrical lines to pass from the tubular-framed nose cone 100 to the portion of the internal welder unit 20 on the other side of the line-up station 73.

The aligners 101 are then retracted out of the way and the second pipe segment is butted up against the first pipe segment. The second set of shoes 78b and 78d, and the corresponding shoes, not shown, on the second double acting air cylinder assembly 128 next extends radially outward by applying compressed air into a chamber 119b via a port 129b. Similar in operation to shoes 78a and 78c of assembly 126, a piston 124b causes a ring 121b to move toward a second port 127b. The linear motion of ring 121b drives links 120b and 120d to activate shafts 115b and 115d to clamp shoes 78b and 78d of shoe holders 116b and 116d, respectively. The radially outward extension of the second set of shoes clamps the second pipe segment 26 about the inner periphery thereof, causing the abutting ends of the pipe segments 24 and 26 to be aligned for welding. In this manner, the pipe segments 24 and 26 are aligned and ready for welding. In certain situations where the ends of the pipe segments may be disrupted such that they no longer have a precisely circular cross section, the line-up station 73 deforms the ends of the pipe segments 24 and 26 into a circular configuration at the abutting ends, as well as positioning the ends in alignment.

After the pipe segments have been butted together, the laser beam 67 is transmitted from the laser beam conductor 68 to the interior of the abutting ends of pipe segments 24 and 26 through a nozzle 83. Laser beam conductor 68 is positioned inside a rotatable disk 75. Rotatable disk 75 has a first chamber 114a and a second chamber 114b for receiving the laser beam conductor 68. In the single laser beam conductor arrangement shown in FIG. 2, laser beam conductor 68 is threaded through second chamber 114b and enters nozzle 83.

Figure 3:
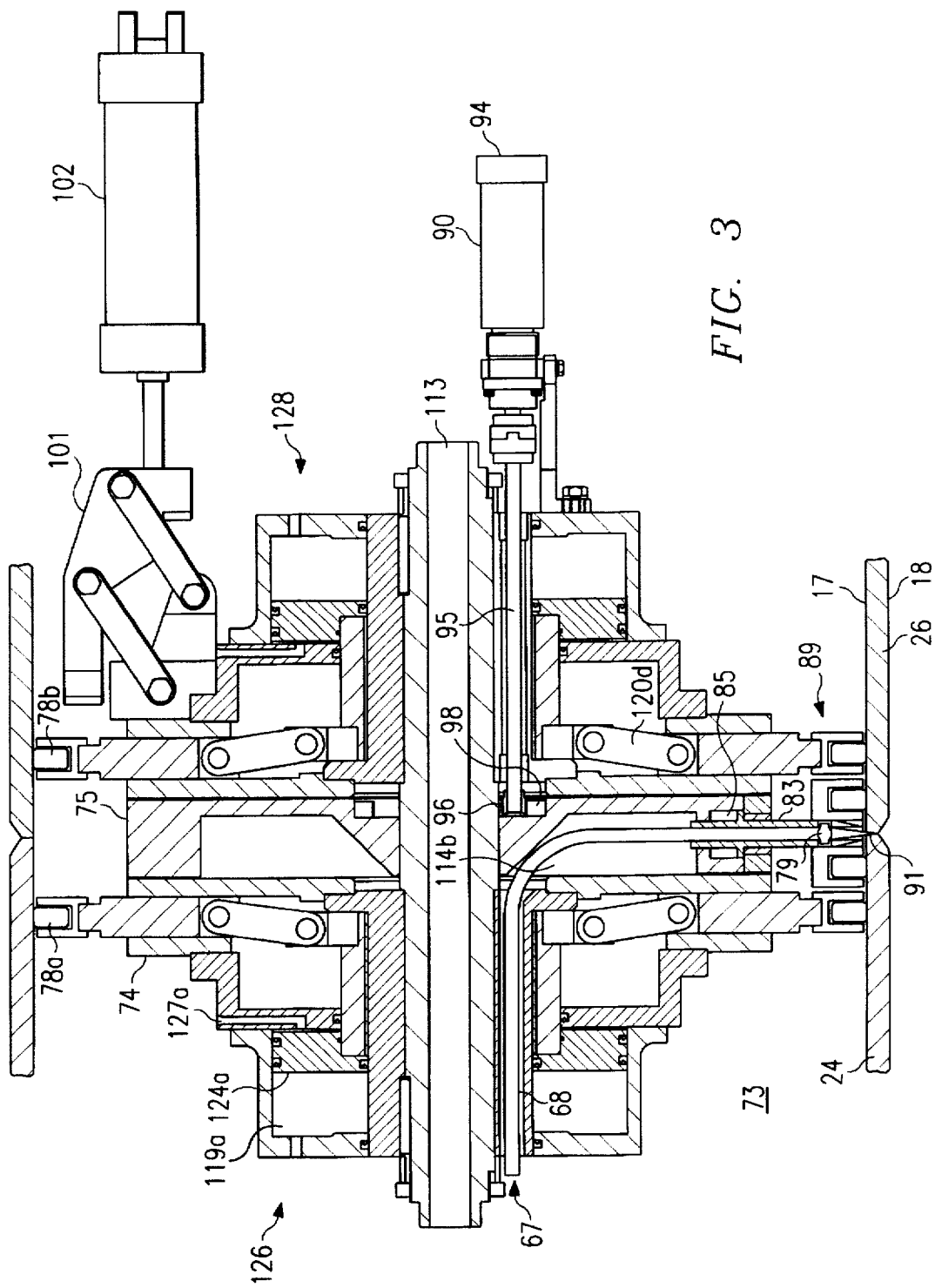
FIG. 3 is a longitudinal, cross-sectional view of the line-up clamp assembly of the internal welder of FIG. 1 during welding.

Referring also to FIG. 3, nozzle 83 has a focusing lens 79 positioned in the path of the laser beam 67 for focusing the laser beam 67 onto the abutting ends of the pipe segments 24 and 26 through the tip of nozzle 83 to a welding focus point 91. The nozzle 83 is urged against the inside of the rotatable disk 75 by compressed air provided to a nozzle chamber 85.

Rotatable disk 75 is supported by a wheel assembly 89. Each wheel 87 of a wheel assembly 89 rides along the inside surface 17 of the pipe segments. Wheel assembly 89 is attached to nozzle 83. By adjusting the position of the wheel assembly 89 with respect to the nozzle 83, the welding focus point 91 can be maintained at the desired distance above or below the inside surface of the abutting ends of the pipe segments. The nozzle 83 also contains auxiliary gas nozzles, not shown, to disperse the metal vapor plume created during the laser welding process and shield the weld metal. Such gas shielding for welding is well known in the art.

Laser motor drive 90 rotates the rotatable disk 75 to direct the laser beam 67 exiting laser beam conductor 68 onto the abutting ends of pipe segments 24 and 26. The motor drive 90 is coupled through a shaft 95 to rotatable disk 75 through a pinion gear 96 and a ring gear 98 to rotate the nozzle 83. The movement of laser beam conductor 68 guides the laser beam 67 circumferentially around the interior of the pipeline through rotating disk 75 to weld together the abutting ends of pipe segments 24 and 26. After each revolution, the rotatable disk 75 reverses its direction for the next welding pass so as to avoid tangling the laser beam conductor 68 and damaging the laser beam conductor 68 due to over-twisting.

The laser motor drive 90 includes the position encoder 94 which produces a digital data signal indicating the position of the nozzle 83 carrying the laser beam. The signal from encoder 94 indicates the sweep position of the laser beam 67 around the interior of the junction of the abutting ends of pipe segments 24 and 26.

FIG. 3 illustrates the line-up station 73, as shown in FIG. 2, during welding. As shown, aligner 101 is retracted to a resting position. Laser beam 67 is guided by laser beam conductor 68 and is eventually directed through focusing lens 79 to be delivered to the welding focus point 91. Laser motor drive 90 is engaged with rotatable disk 75 to move the laser beam around the circumference of the interior 17 of the pipe segments 24 and 26.

Figure 4:
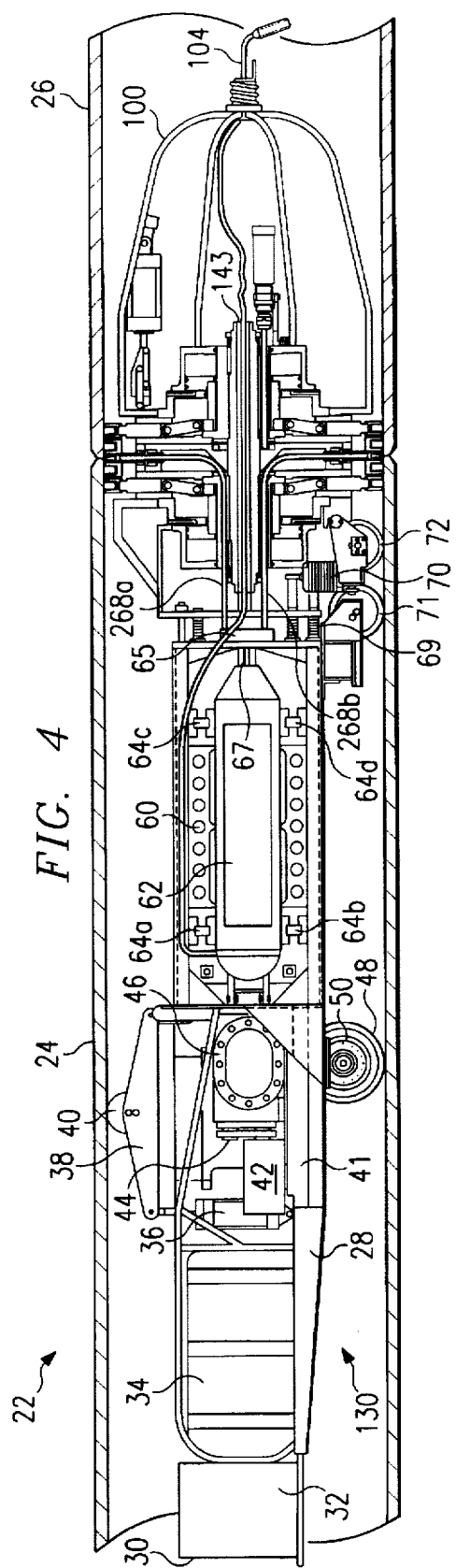
FIG. 4 is a longitudinal, elevational view, partly in cross section, of a second embodiment of the internal welder in accordance with the present invention.
Figure 5:
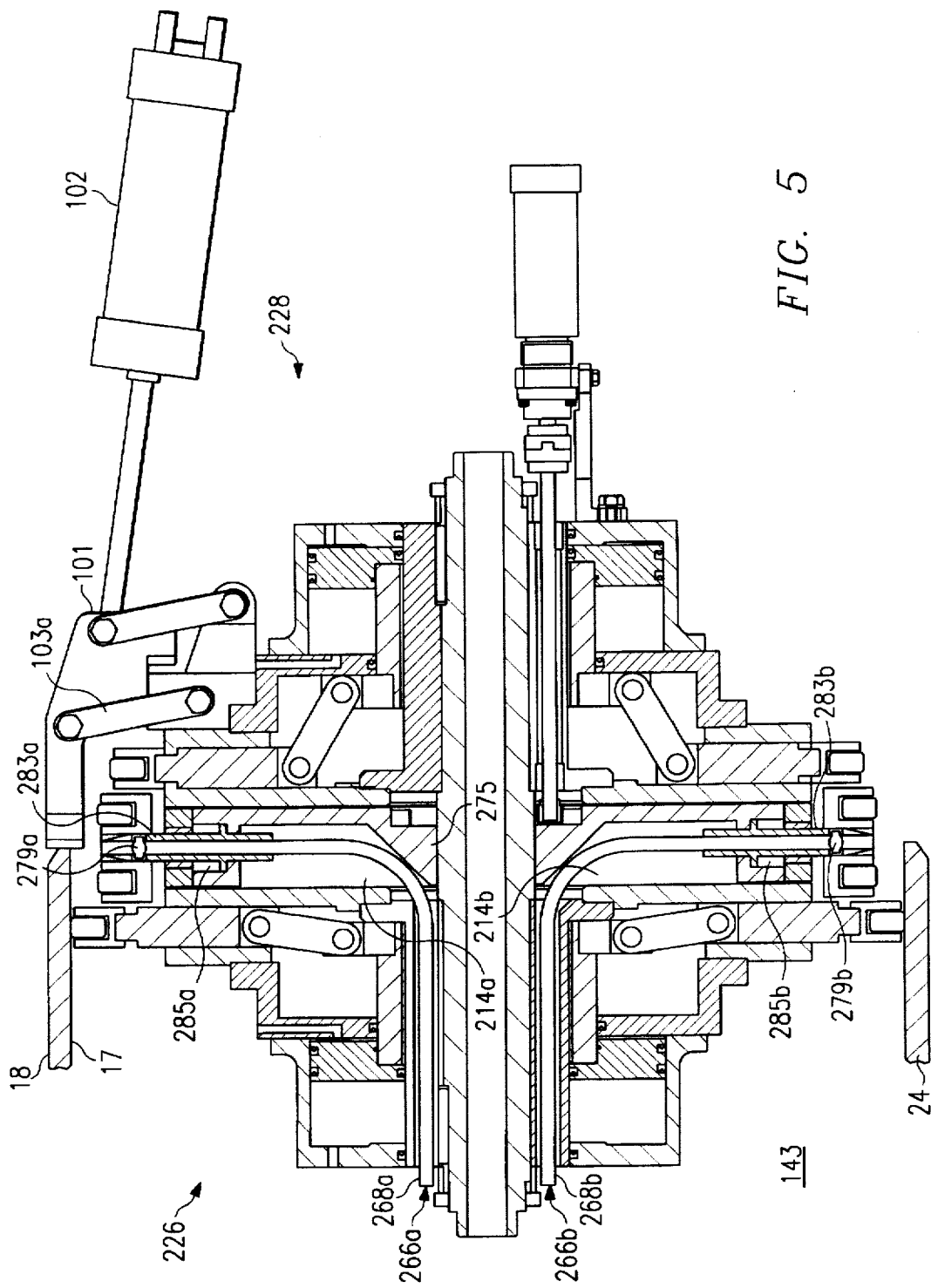
FIG. 5 is a longitudinal, cross-sectional view of the line-up clamp assembly of the internal welder of FIG. 4 during alignment.
Figure 7:
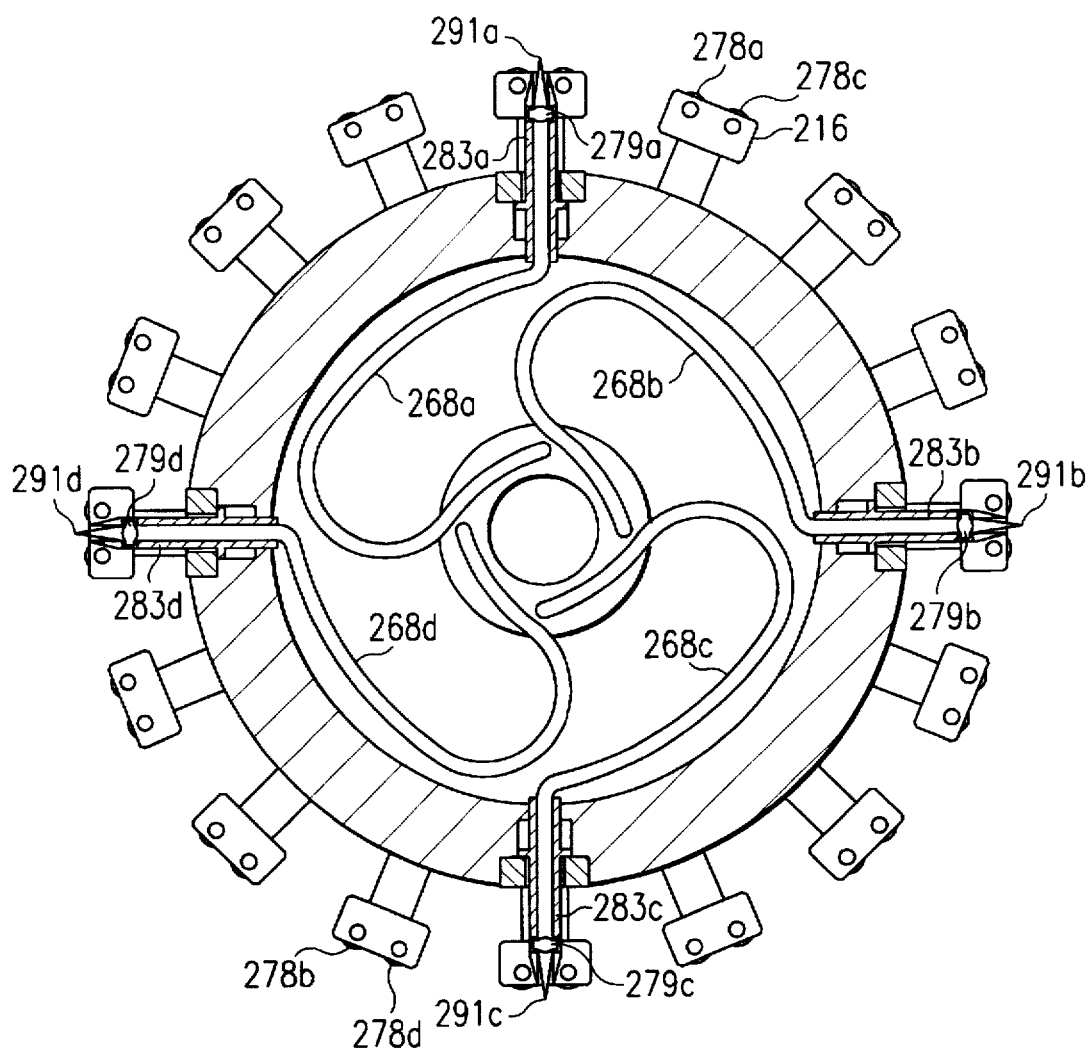
FIG. 7 is a cross-sectional view of the line-up clamp assembly of the internal welder of FIG. 4.

FIG. 4 shows a second embodiment of the present invention. In this embodiment, the internal welder unit 130 is the same as internal welder unit 20 with respect to the reference numerals, except that the laser beam 67 generated by laser source 62 is split by a laser beam splitter 65 into four laser beams that are carried by laser beam conductors. Laser beams 266a and 266b are illustrated in FIG. 5. The longitudinal, elevational view of FIG. 4 shows only two laser beam conductors 268a and 268b, while the remaining laser beam conductors 268c and 268d and their associated components are shown in FIG. 7. These laser beam conductors enter a line-up station 143 to be redirected to aim circumferentially toward the interior surface of pipeline 22.

FIG. 5 is an enlarged longitudinal, cross-sectional, partial view of the embodiment of FIG. 4 which illustrates the alignment of the laser beams with the abutting end of first pipe segment 24. As shown in FIG. 5, line-up station 143 has a first double acting air cylinder assembly 226 and a second double acting air cylinder assembly 228 that are operationally identical to the cylinder assemblies 126 and 128 described in reference to FIG. 2.

Line-up station 143 contains a total of four laser beam conductors 268a–268d, although only laser beam conductors 268a and 268b are shown in FIG. 5. As shown in FIG. 5, laser beam conductors 268a and 268b are threaded through chambers 214a and 214b in a rotatable disk 275 and enters nozzles 283a and 283b having focusing lens 279a and 279b. Nozzles 283a and 283b are urged against the inside of rotatable disk 275 by compressed air provided to nozzle chambers 285c and 285b. See note FIG. 5. Each of nozzles 283a and 283b is functionally identical to nozzle 83 of FIG. 2. The laser beams 266a and 266b are focused onto the abutting ends of the pipe segments 24 and 26 through the tip of nozzles 283a and 283b to welding focus points 291a and 291b. Although FIG. 5 shows only two laser beam conductors, the description of laser beam conductors 268a and 268b is equally applicable to laser beam conductors 268c and 268d which are shown in FIG. 1.

During alignment, the line-up station 143 is moved slightly beyond the end of pipe segment 24. Aligners 101 are activated and the line-up station 143 is adjusted to align the focusing lens 279a and 279b with the end of pipe segment 24 as described in reference to FIG. 2.

Figure 6:
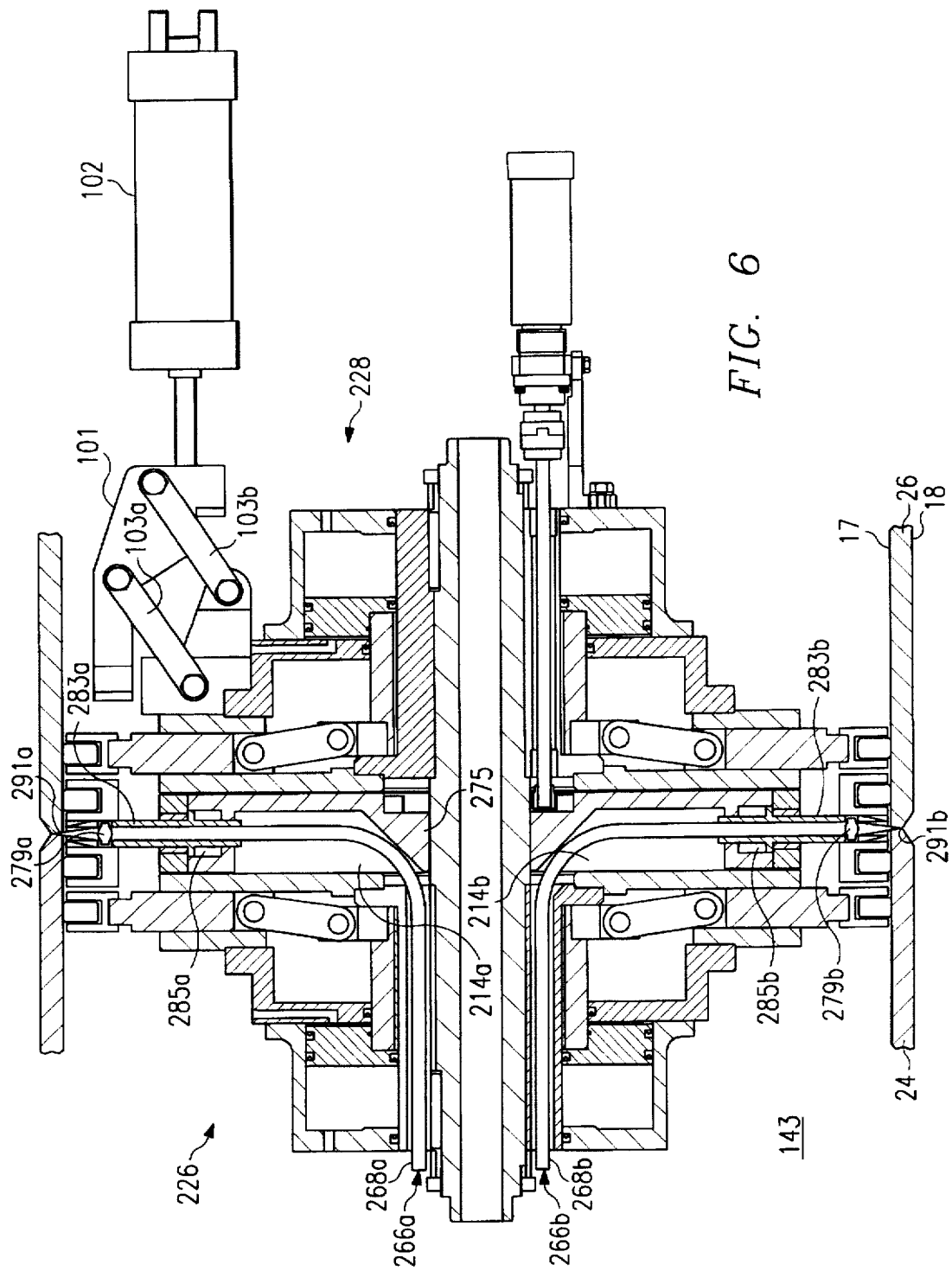
FIG. 6 is a longitudinal, cross-sectional view of the line-up clamp assembly of the internal welder of FIG. 4 during welding.

FIG. 6 illustrates the welding operation of the four laser beam system shown in FIG. 5. In FIG. 6, the aligners 102 are retracted and the second pipe segment 26 has then positioned against the first pipe segment 24. A second set of shoes on the second double acting air cylinder assembly 228 expands radially outward to clamp the second pipe segment 26. Next, the laser beam 67 is transmitted from laser source 62 to beam splitter 65, which splits the laser beam into four laser beams 266a–266d, only two of which are shown in the longitudinal, cross-sectional view of FIG. 6. The two laser beams 266a and 266b are transmitted through laser beam conductors 268a and 268b to the interior of the abutting ends of pipe segments 24 and 26 through nozzles 283a and 283b. It is understood that the foregoing description of laser beam conductors 268a–268b are also applicable to the hidden laser beam conductors 268c–268d of FIG. 6. Because the delivery of the laser beam is accomplished via four laser beam conductors, the line-up station 143 only needs to rotate the disk 275 by 90° to provide complete coverage of the interior circumference of the junction of pipe segments 24 and 26. After each quarter revolution, the rotatable disk 275 reverses its direction for the next welding pass so as to avoid tangling or stressing the laser beam conductors 268a–268d.

While FIG. 6 shows only two of the four laser beam conductors, FIG. 7 illustrates the placement of the four laser beam conductors 268a, 268b, 268c and 268d. In FIG. 7, each shoe holder 216 has shoes 278a and 278c. During operation, all 16 shoe holders, including the wheel assemblies carrying the nozzles 283a–283d, extend radially outward to clamp the inner circumference of the pipe segments 24 and 26. The laser beams are focused by lens 279a, 279b, 279c and 279d. The beams exit through nozzles 283a, 283b, 283c, and 283d to direct the laser beams to focus points 291a, 291b, 291c and 291d to weld together the ends of the pipe segments. Under this arrangement, the line-up station 143 only needs to rotate disk 275 by 90° to provide complete coverage of the circumference of the pipe segments 24 and 26.

Figure 8:
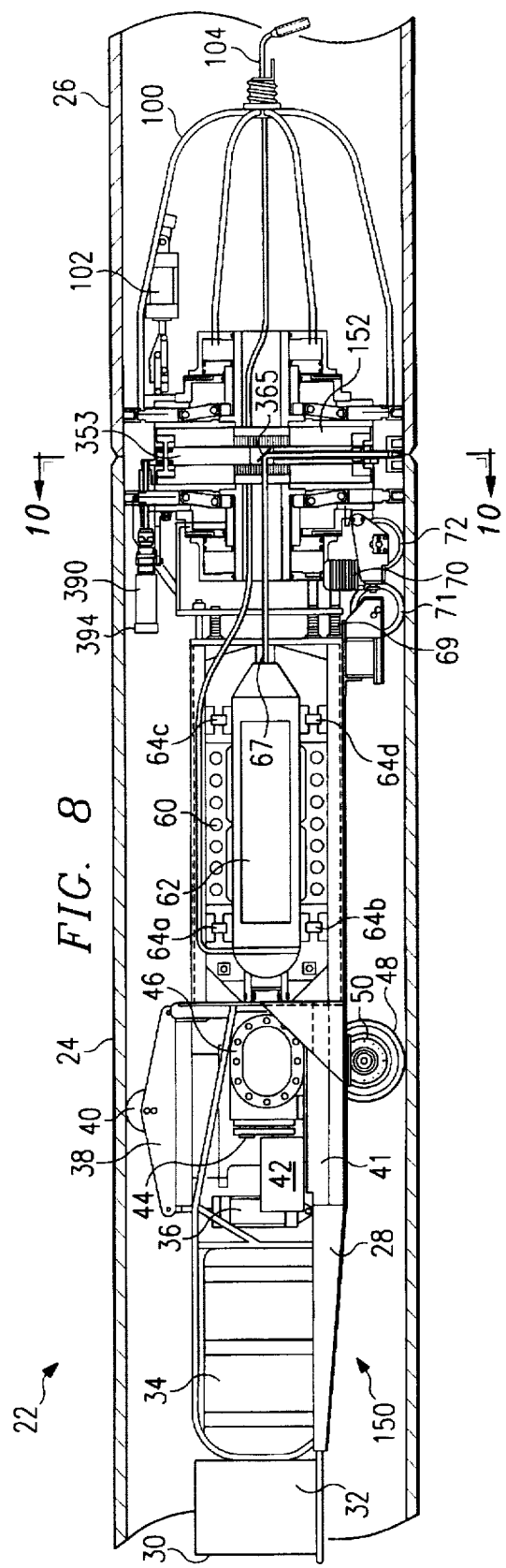
FIG. 8 is a longitudinal, elevational view, partly in cross section, of a third embodiment of the internal welder in accordance with the present invention.

FIG. 8 shows a third embodiment of the present invention. In this embodiment, the internal welder unit 150 is the same as internal welder unit 20 with respect to the reference numerals, except the laser beam conductor 68 of line-up station 152 is replaced with a reflecting surface 365. The reflecting surface 365, preferably a mirror, reflects the laser beam 67 coming out of the laser source 62 for transmission to the inner periphery of the abutting ends of the pipe segments 24 and 26. The reflecting surface 365 is mounted inside rotatable disk 353 for reflecting and directing laser beam 67 essentially at a 90° angle relative to the axis of the pipeline 22 at the abutting ends of pipe segments 24 and 26. Rotatable disk 353 is driven by laser motor drive 390 whose rotations are monitored by position encoder 394.

Figure 9:
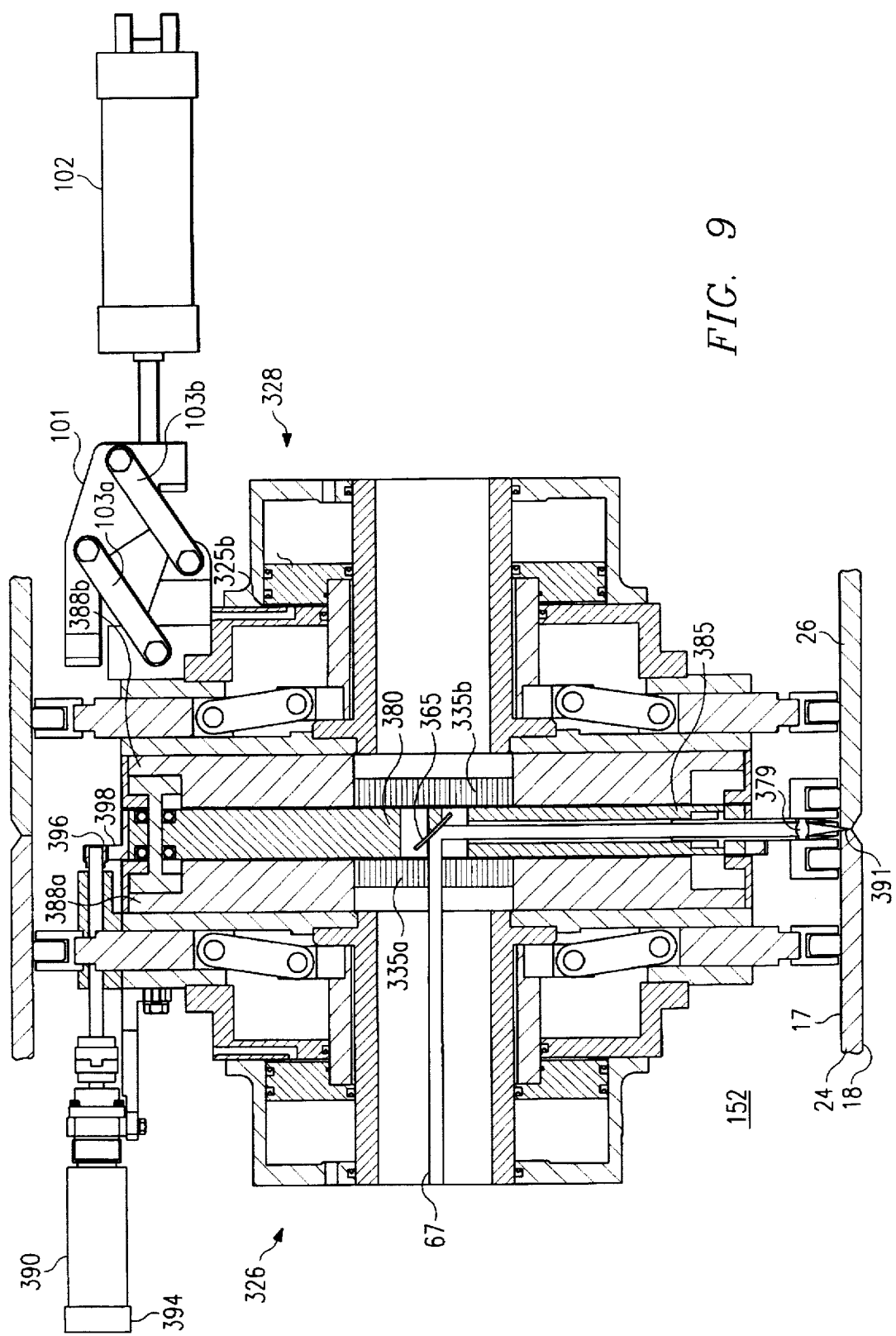
FIG. 9 is a longitudinal, cross-sectional view of the clamp assembly of the internal welder of FIG. 8 during alignment.

FIG. 9 is an enlarged longitudinal, cross-sectional view of a portion of the embodiment of FIG. 8 showing the alignment of line-up station 152 with pipe segment 24. The line-up station 152 arrangement is similar to that of FIG. 2, except that line-up station 152 has been modified for the substitution of a reflecting surface 365 in place of laser conductor 68.

The line-up station 152 consists of a first double acting air cylinder assembly 326 and a second double acting air cylinder assembly 328. Each of the double acting air cylinder assemblies 326 and 328 is identical in operation to the double acting air cylinder assemblies 126 and 128 described in reference to FIG. 2.

The alignment operation of line-up station 152 is similar to that of line-up station 73 of FIG. 2. After the pipe segments have been aligned, the aligners 101 are retracted and the second set of shoes on the second double acting air cylinder assembly 328 expands radially outward and clamps against the inner periphery of the second pipe segment 26. Next, the laser beam 67 is transmitted from laser source 62 to the reflecting surface 365, which redirects the laser beam 67 to the interior 17 of the abutting ends of pipe segments 24 and 26 through nozzle 385.

Figure 11:
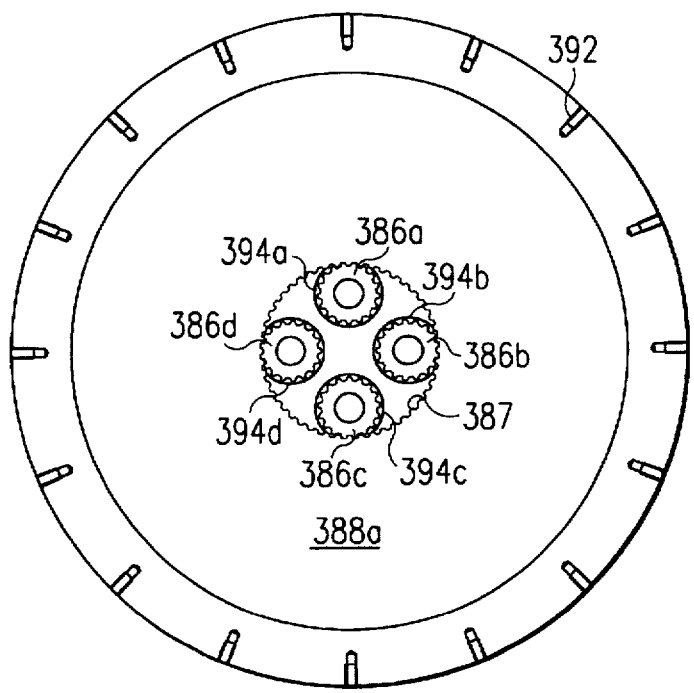
FIG. 11 is a transverse cross-sectional view of an outer plate of the internal welder of FIG. 8.

Reflecting surface 365 is positioned inside a rotatable disk 380, further shown in FIG. 11. Rotatable disk, or center plate, 380 is sandwiched between two outer plates 388a and 388b, which are further shown in FIGS. 11 and 12. Rotatable disk 380 includes a nozzle 385 for delivering the laser beam 67 to the inner circumference of pipe segments 24 and 26. Nozzle 385 has a focusing lens 379 positioned in the path of the laser beam 67 for focusing the laser beam 67 onto the abutting ends of the pipe segments 24 and 26 through the tip of nozzle 385 to a welding focus point 391.

A laser motor drive 390 rotates the rotatable disk 380 to direct the laser beam 67 exiting the reflecting surface 365 onto the abutting ends of pipe segments 24 and 26. The shaft of motorized drive 390 is coupled with rotatable disk 380 through pinion gear 396 and ring gear 398 to rotate disk 380. As shown in FIG. 9, the movement of reflecting surface 365 guides the laser beam 67 circumferentially around the interior of the pipeline through rotating disk 375 to weld together the abutting ends of pipe segments 24 and 26.

Figure 10:
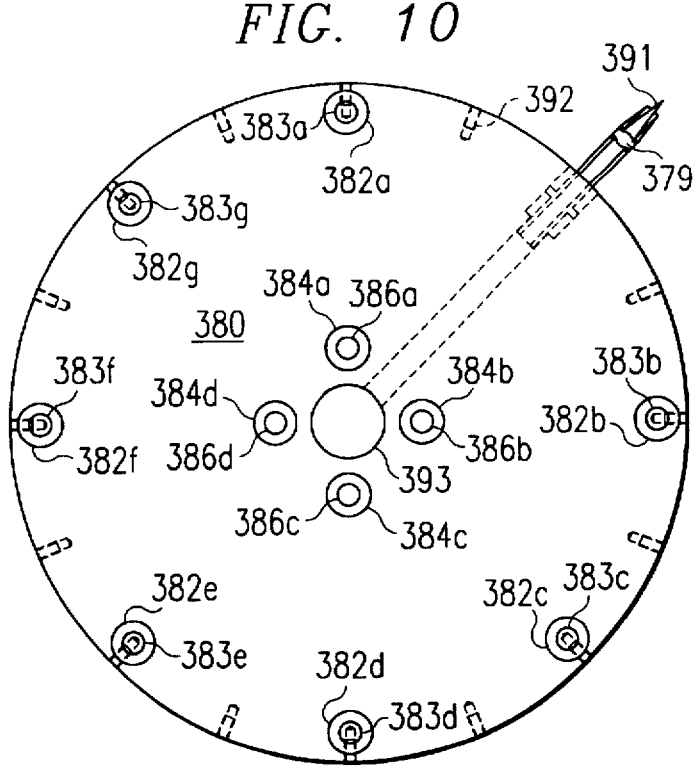
FIG. 10 is a transverse cross-sectional view of the center plate of the internal welder of FIG. 8 taken along line 10—10.

FIG. 10 is a cross-sectional view of the rotatable disk, or center plate, 380 for the internal welder shown in FIG. 8. The reflecting surface 365 is housed in space 393 for directing the laser beam through focusing lens 379 to the welding focus point 391. The rotatable disk, or center plate, 380 includes four gear bearing holes 384a–384d containing hollow gears 386a–386d. The hollow gears 386a–386d enable gas lines and electrical trunks to be passed through the line-up station 152. Center plate 380 also has seven bearing holes 382a–382g equally spaced out on the periphery of center plate 380. Members 383a–383g penetrate through bearing holes 382a–382g to clamp first outer plate 388a, center plate 380 and second outer plate 388b together. As shown in FIG. 10, bearing holes 382a–382g are equally spaced at every two recesses 392 that house the roller shafts for the shoes.

FIG. 11 is a cross-sectional view of the outer plate 388a for the internal welder of FIG. 8. Because outer plate 388a is representative of outer plate 388b, the description of outer plate 388a also applies to that of outer plate 388b.

Outer plate 388a contains a plurality of recesses 392 housing roller shafts. The outer plate 388a further has a plurality of gears 394a–394d. The gears 394a–394d are in contact with gear teeth 387 to receive the rotational energy to drive the rotatable disk, or center plate, 380. Further, gears 394a–394d are hollow, allowing gas lines and electrical trunks to pass through the plates and supply the other side of the internal welder unit.

Figure 12:
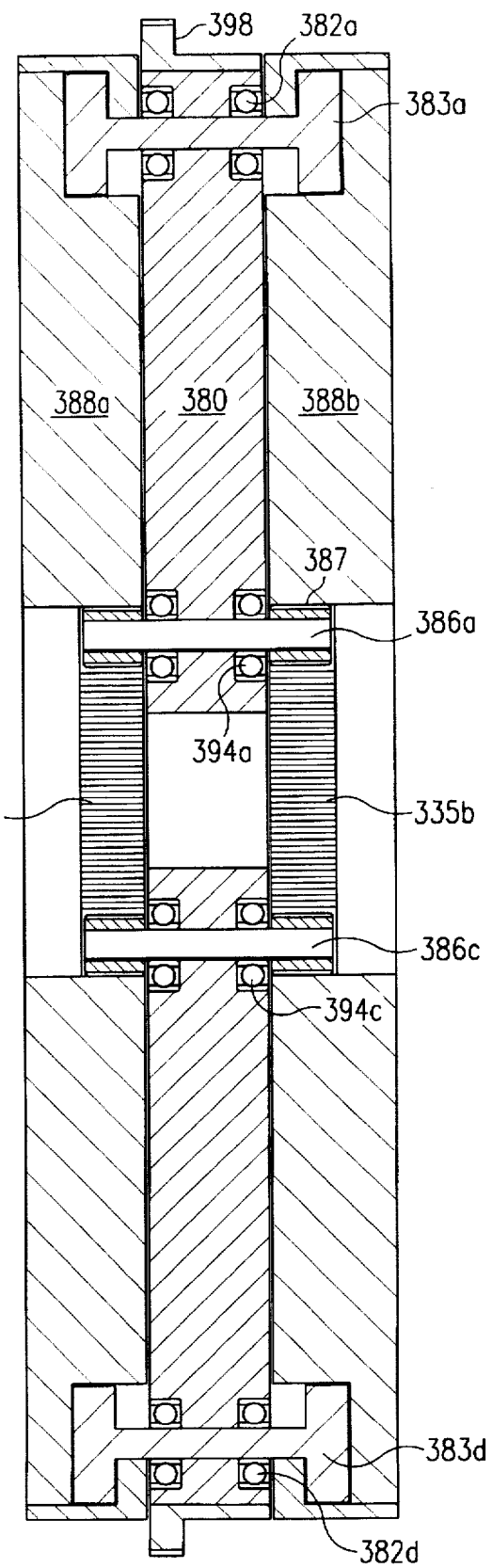
FIG. 12 is an enlarged longitudinal, cross-sectional view of the mirror assembly of FIG. 8.

A more detailed cross-sectional view of the combination of outer plate 388a, center plate 380 and outer plate 388b is shown in FIG. 12. Members 383a and 383d protrude through bearing holes 382a and 382d to clamp first outer plate 388a, center plate 380 and second outer plate 388b together. Hollow tubes 386a and 386c inside gears 394a and 394c enable gas lines and electric trunks to traverse through plates 388a, 380 and 388b to get to the other side of the internal welder unit. As shown in FIG. 12, reflecting surface frames 335a and 335b provides structural support for mounting the reflecting surface, not shown, in the center plate 380. Further, ring gear 398 is in contact with center plate 380 to deliver rotational energy generated by laser motor drive 390 to center plate 380.

FIG. 13 shows a longitudinal view of the fourth embodiment of the present invention where the welder carriage assembly is mounted externally on a pipeline. Externally mounted welders are disclosed in U.S. Pat. Nos. 3,718,798 to Randolph et al. which issued on Feb. 27, 1973 and 3,806,694 to Nelson et al. which issued on Apr. 23, 1974. These two patents are incorporated herein by reference. Representative welders that have a drive assembly for positioning the welder along the gap at the junction of the abutting ends of the pipe segments are shown in U.S. Pat. Nos. 3,193,656 to Bell et al. which issued on Jul. 6, 1965, 3,974,356 to Nelson et al. which issued on Aug. 10, 1976, 4,151,395 to Kushner et al. which issued on Apr. 24, 1979. These three patents are incorporated herein by reference.

In FIG. 13, the pipeline 432 is made up of a plurality of pipe segments, including a first pipe segment 434 and a second pipe segment 436, which are joined together at their abutting ends. In this embodiment, first and second tracks 440 and 442 are mounted on the outside circumference of the pipe segment 434. The external welder unit 438 is attached to the pipe segment 434 via first and second tracks 440 and 442, which carry the external welder unit 438 orbitally around the axis of pipeline 432. The external welder unit 438 includes a carriage assembly 439 containing the laser source 462 and drive assembly 456 for propelling the external welder unit 438 orbitally around the outside of the pipeline 432.

The external welder unit 438 is coupled to first and second tracks 440 and 442 through first and second mounting legs 448 and 450. The carriage assembly 439 of the external welder unit 438 is attached to the first and second mounting legs through carriage mount 452. The first mounting leg 448 has a first gear coupling box 444 and the second leg 450 has a second gear coupling box 446. An axle 445 mechanically links the first and second gear coupling boxes 444 and 446 so that the drive assembly 456 is mechanically coupled to both first and second gear coupling boxes 444 and 446. Each of the first and second gear coupling boxes 444 and 446 has a set of front gear wheel 447 and rear gear wheels 449 that engage with the slots on the tracks 440 and 442 to provide for the rotation of the external welder unit 438. In this manner, drive assembly 456 is mechanically linked with the front and rear gear wheels 447 and 449 of the first and second mounting legs 448 and 450 to permit the external welder unit 438 to be rotated orbitally around the axis of pipeline 432 upon activation of the drive assembly 456.

The carriage assembly 439 of the external welder unit 438 contains a laser source 462 supported on a flexible mountings 454. Flexible mountings 454 are provided between the mounting legs 448 and 450 and the base of the laser source 462 to prevent unwanted shocks from damaging the laser source. The laser source 462 generates a laser beam 467 which is directed essentially along the orbital axis of the external welder 438. The laser beam 467 has a power output great enough to weld together pipe segments 434 and 436. A hood assembly 463 shields the laser beam 467 from the point it exits laser source 462 to the point where the laser beam 467 enters the reflecting surface assembly 479. The hood assembly 463 is mounted to external welder unit 438 by hood frame 466. Nozzle 483 is mechanically supported by nozzle frame 465 and attached to the external welder through nozzle coupling 464. A handle 458 is provided on top of the external welder unit to facilitate movement of the external welder unit.

During operation, the external welding unit is advanced from the weld just completed to the next end of the pipeline. Once the external welder is properly mounted on the pipeline, the laser source is turned on to generate the laser beam. The reflecting surface assembly 479 deflects the laser beam 467 through the tip of nozzle 483 to the external junction of the pipeline to weld together the abutting ends of pipe segments 434 and 436. The drive assembly 456 is then engaged to rotate the external welder unit 438 so as to direct the laser beam circumferentially along the junction of abutting ends of pipe segments 434 and 436 to weld them together.

FIG. 14 is a cross-sectional view of the external welder carriage for use in conjunction with the fourth invention shown in FIG. 13. In FIG. 14, tracks 440 and 442 are mounted on pipe segment 434. Tracks 440 and 442 carry the external welder 438 so as to permit external welder 438 to orbitally rotate around the center of the pipeline 432. FIG. 14 shows the front and rear gear wheels 447 and 449 engaging with tracks 440 and 442 to permit movement by the external welder 438. FIG. 12 also shows fins 490, 492 and 494 projecting from the carriage assembly 439 of the external welder unit to facilitate movement of the external welder unit 438.

The internal welder unit 20 can be functionally coordinated with the external welder unit 438 to have the external welder working into the heat generated by the internal welder. This coordination can provide for an improved joint and can enhance the speed of operation for the overall welding procedure.

Figure 15:
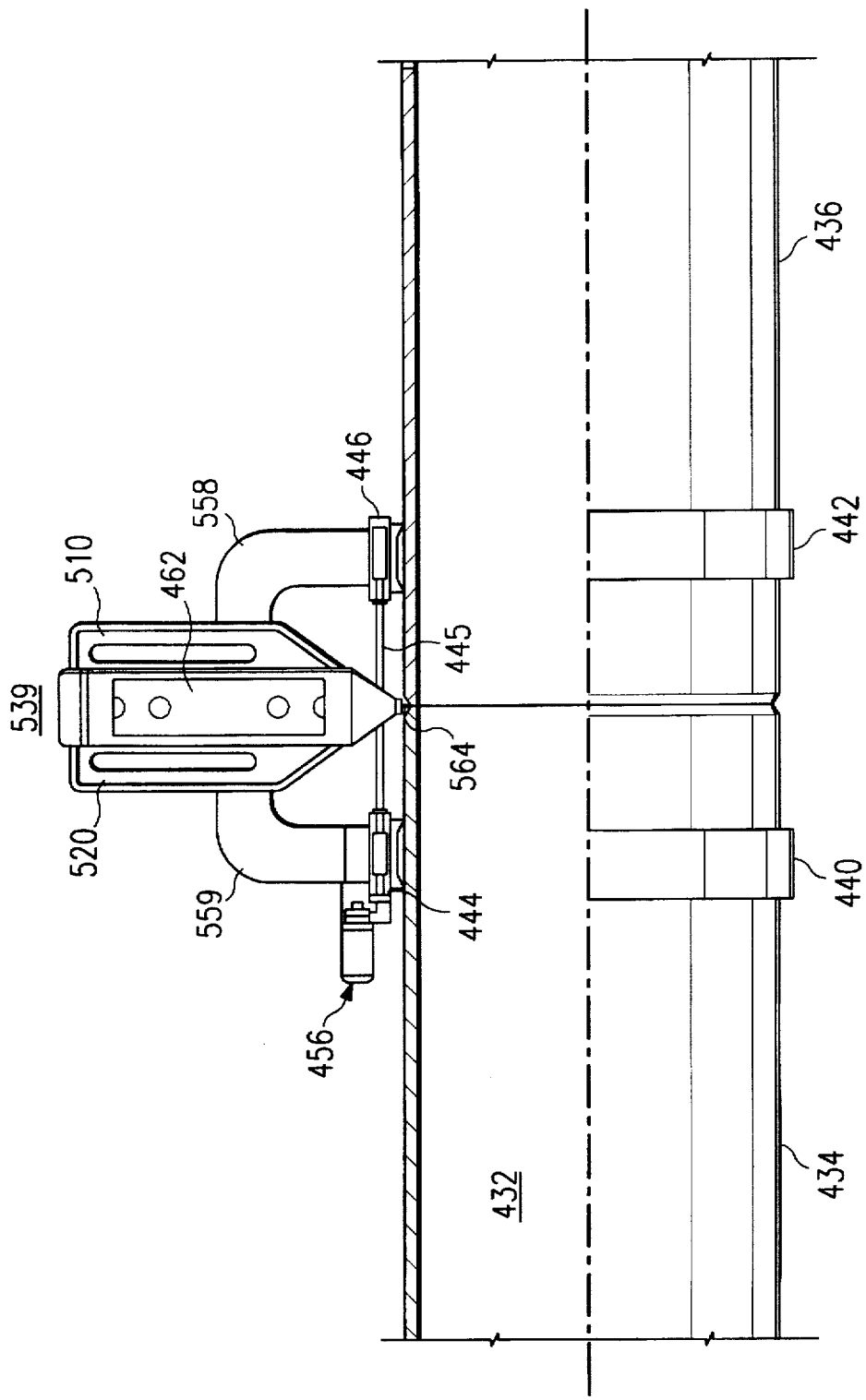
FIG. 15 is a longitudinal, elevational view of a fifth embodiment of an external welder in accordance with the present invention.

FIG. 15 is a longitudinal view of a fifth embodiment of the present invention where the welder carriage assembly is mounted externally on a pipeline. In FIG. 15, the external welder unit 539 is attached to pipe segments 434 and 436, which are joined together at their abutting ends. Pipes 434 and 436 are further clamped by first and second tracks 440 and 442. As shown in FIG. 15, the external welder unit 539 includes a laser source 462 with mount brackets 510 and 520 extending laterally from laser source 462. The laser source 462 generates a laser beam whose output is focused by an adjustable focusing lens 564.

The welder unit 539 is coupled to the first and second gear coupling boxes 444 and 446 via a first and second legs 558 and 559. In the operating manner disclosed in FIG. 14, the drive assembly 456 is mechanically linked via axle 445 with the wheels located in the bottom of the first and second legs 558 and 559 to permit the external welder unit 539 to rotate orbitally around the axis of pipeline 432 upon engagement of the drive assembly 456. Upon activation, laser source 462 delivers a laser beam circumferentially on the outside of the abutting ends of pipe segments 434 and 436 and weld the segments together.

Although several embodiments of the invention have been illustrated in the accompanying description and the drawings, it will be understood that the invention is not limited to the embodiments disclosed, but is capable of a variety of modifications and substitutions without departing from the scope of the invention.

What I claim is:

1. An external welder for a pipeline for welding together a junction of abutting ends of first and second pipe segments, comprising:

a track mounted on the outside of said pipeline;

a carriage assembly connected to said track for carrying said carriage assembly orbitally about the axis of said pipeline on said track;

a laser source mounted on said carriage assembly to produce a laser beam;

a reflecting surface positioned in the path of said beam for directing said laser beam to the abutting ends of said first and second pipe segments; and a drive mounted on said carriage assembly, said drive propelling said carriage assembly around the axis of said pipeline to direct said laser beam along the junction of the abutting ends of said pipe segments for welding said pipe segments together.

2. An external welder for a pipeline as recited in claim 1, wherein said drive is a motor having a shaft, said shaft coupled to said carriage assembly for propelling said carriage assembly orbitally about the axis of said pipeline on said track.

3. An external welder for a pipeline as recited in claim 1, wherein said reflecting surface is a mirror supported by said carriage assembly and positioned at a forty five degree angle relative to the axis of said beam.

4. An external welder for a pipeline as recited in claim 1, wherein said laser source generates said laser beam which is directed essentially parallel to the axis of said pipeline.

5. An external welder for a pipeline for welding together a junction of abutting ends of first and second pipe segments, comprising:

a track mounted on the outside of said pipeline;

a carriage assembly connected to said track for carrying said carriage assembly orbitally about the axis of said pipeline on said track;

a laser source mounted on said carriage assembly to produce a laser beam in position to direct said laser beam without deflection to the abutting ends of said first and second pipe segments; and a drive mounted on said carriage assembly, said drive propelling said carriage assembly around the axis of said pipeline to direct said laser beam along the junction of the abutting ends of said pipe segments for welding said pipe segments together.

6. An external welder for a pipeline as recited in claim 5, wherein said drive is a motor having a shaft, said shaft coupled to said carriage assembly for propelling said carriage assembly orbitally about the axis of said pipeline on said track.

7. An external welder for a pipeline as recited in claim 5, wherein said laser source generates said laser beam which is directed essentially parallel to the axis of said pipeline.

* * * * *

UNITED STATES PATENT AND TRADEMARK OFFICE
CERTIFICATE OF CORRECTION

PATENT NO. : 5,796,068
DATED : August 18, 1998
INVENTOR(S) : Richard L. Jones

It is certified that error appears in the above-indentified patent and that said Letters Patent is hereby corrected as shown below:

```
Column 6, line 6, change "120c" to --120a--.
Column 6, line 6, change "115b" to --115a--.
Column 6, line 6, change "78c" to --78a--.
Column 8, line 15, change "285c" to --285a--.
Column 8, line 15, delete --note--.
Column 9, line 54, change "375" to --380--.
```

Signed and Sealed this

Twenty-sixth Day of October, 1999

Attest:

Q. TODD DICKINSON

*Attesting Officer*   Acting Commissioner of Patents and Trademarks